(12) United States Patent
Glugla et al.

(10) Patent No.: US 9,945,344 B2
(45) Date of Patent: Apr. 17, 2018

(54) METHOD AND SYSTEM FOR IGNITION CONTROL

(71) Applicant: Ford Global Technologies, LLC, Dearborn, MI (US)

(72) Inventors: Chris Paul Glugla, Macomb, MI (US); Nelson William Morrow, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 467 days.

(21) Appl. No.: 14/814,764

(22) Filed: Jul. 31, 2015

(65) Prior Publication Data
US 2017/0030322 A1 Feb. 2, 2017

(51) Int. Cl.
| F02P 5/15 | (2006.01) |
| F02D 41/00 | (2006.01) |
| F02P 5/04 | (2006.01) |
| F02P 11/00 | (2006.01) |
| F02D 37/02 | (2006.01) |

(52) U.S. Cl.
CPC ............... *F02P 5/15* (2013.01); *F02D 37/02* (2013.01); *F02D 41/005* (2013.01); *F02D 41/0055* (2013.01); *F02P 5/045* (2013.01); *F02P 5/1502* (2013.01); *F02P 11/00* (2013.01); *F02P 5/1516* (2013.01); *Y02T 10/46* (2013.01); *Y02T 10/47* (2013.01)

(58) Field of Classification Search
CPC .. F02P 5/15; F02P 5/1502; F02P 5/045; F02P 5/1516; F02P 11/00; Y02T 10/46; Y02T 10/47; F02D 41/005; F02D 41/0055; F02D 37/02
See application file for complete search history.

(56) References Cited

U.S. PATENT DOCUMENTS

| 4,193,381 | A | * | 3/1980 | Aoyama | F02D 37/02 123/406.69 |
| 4,314,540 | A | * | 2/1982 | Ikeura | F02P 5/1516 123/406.48 |
| 5,142,479 | A | * | 8/1992 | Poirier | F02D 41/064 123/179.16 |
| 5,183,020 | A | * | 2/1993 | Hosoi | F02P 5/1516 123/406.48 |
| 5,967,122 | A | * | 10/1999 | Muntzer | F02D 37/02 123/169 EL |
| 6,041,756 | A | * | 3/2000 | Bonne | F02D 35/027 123/406.24 |
| 6,470,850 | B1 | * | 10/2002 | Sasaki | F02B 23/0672 123/305 |
| 7,578,281 | B2 | | 8/2009 | Russell et al. | |
| 7,665,452 | B2 | | 2/2010 | Russell et al. | |

(Continued)

*Primary Examiner* — Hieu T Vo
*Assistant Examiner* — Arnold Castro
(74) *Attorney, Agent, or Firm* — Julia Voutyras; McCoy Russell LLP

(57) ABSTRACT

Methods and systems are provided for addressing spark plug soot fouling. In one example, spark plug tip temperatures are raised and maintained elevated by advancing spark timing and increasing engine speed, while reducing an amount of EGR being delivered to the engine. The spark plug fouling mitigating actions are adjusted based on whether the engine is in a green condition at an assembly plant or not.

20 Claims, 4 Drawing Sheets

(56) References Cited

U.S. PATENT DOCUMENTS

| | | | |
|---|---|---|---|
| 8,050,844 B2* | 11/2011 | Hoard | F02D 41/405 |
| | | | 123/299 |
| 8,132,556 B2 | 3/2012 | Glugla et al. | |
| 8,301,358 B2 | 10/2012 | Kurtz | |
| 8,396,646 B2 | 3/2013 | Itoga et al. | |
| 9,719,436 B2* | 8/2017 | Glugla | F01L 1/34 |
| 2007/0079817 A1* | 4/2007 | VanDyne | F02D 35/021 |
| | | | 123/568.21 |
| 2007/0215130 A1* | 9/2007 | Shelby | F02D 35/027 |
| | | | 123/637 |
| 2010/0057324 A1* | 3/2010 | Glugla | F02D 35/021 |
| | | | 701/102 |
| 2011/0166795 A1* | 7/2011 | Ohshima | F02D 41/0072 |
| | | | 702/22 |
| 2015/0176558 A1* | 6/2015 | Glugla | F02P 17/12 |
| | | | 123/294 |
| 2017/0002786 A1* | 1/2017 | Glugla | F02P 17/12 |
| 2017/0030321 A1* | 2/2017 | Glugla | F02P 5/1455 |
| 2017/0356359 A1* | 12/2017 | Glugla | F02D 41/0025 |

* cited by examiner

| Engine Condition → | Action for addressing spark plug fouling ||||
|---|---|---|---|
| | Advanced spark timing | EGR reduction | Increase in Ne |
| Pre-delivery (Green condition) | More advanced from nominal and supplied for longer duration | Larger reduction for longer duration | Larger increase for longer duration |
| Post-delivery (non-green condition) | Less advanced from nominal and supplied for shorter duration | Smaller reduction for shorter duration | Smaller increase for shorter duration |

FIG. 4

METHOD AND SYSTEM FOR IGNITION CONTROL

FIELD

The present description relates generally to methods and systems for controlling a vehicle engine to address spark plug fouling.

BACKGROUND/SUMMARY

Engine ignition systems may include a spark plug for delivering an electric current to a combustion chamber of a spark-ignited engine to ignite an air-fuel mixture and initiate combustion. Based on engine operating conditions, spark plug fouling can occur wherein a firing tip of the spark plug insulator becomes coated with a foreign substance, such as fuel, oil, or soot. Once fouled, the spark plug may be unable to provide adequate voltage to trigger cylinder combustion until the spark plug is sufficiently cleaned or replaced. For example, the spark plug may be cleaned by burning off the soot accumulated on the fouled spark plug by operating the engine in speed-load conditions that sufficiently raise the spark plug tip temperature.

One example approach for spark plug cleaning is shown by Glugla et al in U.S. Pat. No. 8,132,556. Therein, based on the severity of the spark plug fouling, progressively aggressive actions are taken to burn off the accumulated soot. In particular, spark plug tip temperature is raised using a combination of spark timing advance, increase in engine load, increase in engine speed, etc.

However, the inventors herein have identified potential issues with such an approach. As one example, the various actions may conflict with engine commands for fuel economy. In particular, to improve engine performance, a controller may operate an engine with exhaust gas recirculation to slow combustion, and cool combustion temperatures in an attempt to reduce engine knock and NOx emissions. However, the use of EGR can result in cooler spark plug tip temperatures which makes it difficult for spark plug tip temperatures to be raised, despite the use of spark advance, to an operating temperature required for soot to be burned off from the plug. As a result, even with the use of aggressive spark advance, the spark plug may remain fouled. In addition, spark plug fouling can occur more frequently at lower speeds and light loads where EGR tends to be scheduled. The same problem may occur while the engine is a green engine, that is, while the engine is coupled in a vehicle at an assembly plant, before delivery to a customer. At the assembly plant, the vehicle may be started multiple times due to the vehicle being moved around to multiple lots. In addition, the vehicle may be started to test out engine components. The frequent engine operation generates excess soot which can foul the spark plug. However, the engine may not be operated sufficiently in speed-load regions that allow the spark plug to be warmed and the accumulated soot to be burned off. The cooler spark plug tip temperatures can exacerbate spark plug fouling issue.

In one example, some of the above issues may be at least partly addressed by a method for an engine coupled in a vehicle, comprising: reducing EGR by a larger amount when operating an engine at a vehicle assembly plant; and reducing EGR by a smaller amount when operating the engine responsive to a spark plug cleaning condition after the vehicle has left the assembly plant. In this way, spark plug fouling can be addressed more effectively.

As an example, while a vehicle is being operated and tested at an assembly plant, the engine may be operated with an adjusted EGR schedule. Specifically, since EGR cools combustion, EGR may be reduced by a larger amount for the green engine to enable spark plug tip temperatures to be maintained sufficiently high so as to reduce spark plug fouling issues. Likewise, if spark plug fouling is determined in the green engine, EGR may be reduced albeit by a larger amount. In comparison, when the vehicle is operated after leaving the assembly plant, the engine may be operated with a different EGR schedule responsive to an indication of spark plug fouling. Specifically, EGR may be reduced by a smaller amount to expedite spark plug cleaning. Once it is determined that the spark plug is sufficiently clean, or sufficiently warm, the initial EGR schedule (or a nominal EGR schedule) may be resumed.

The technical effect of adjusting EGR responsive to an indication of spark plug fouling is that EGR interference with spark plug cleaning is reduced. In particular, spark plug tip temperatures may be raised to, and held at, higher temperatures for a longer duration in a green engine (where the vehicle is still at the assembly plant), or a non-green engine (where the vehicle has left the assembly plant), improving spark plug health. By reducing EGR, at least transiently, when operating an engine with spark advance or increased engine speed/load to clean a spark plug, spark plug cleaning can be expedited without compromising the fuel economy and engine performance benefits on EGR usage. By better addressing spark plug fouling, cylinder misfire events can be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows an example engine spark timing and EGR schedule adjustment performed in response to a spark plug fouling event in a non-green engine.

DETAILED DESCRIPTION

Figure 1:
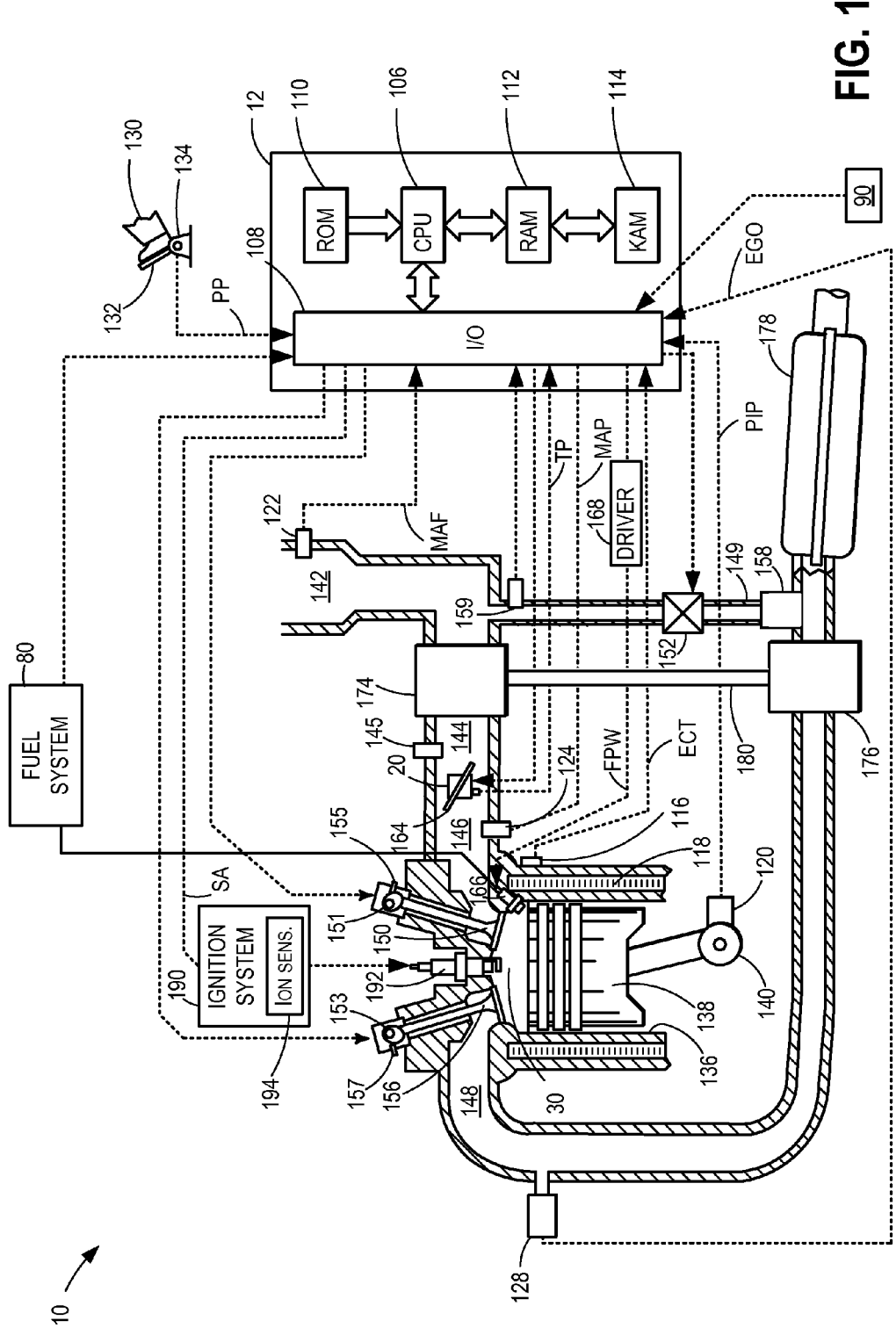
FIG. 1 shows a schematic diagram of an internal combustion engine.

The following description relates to systems and methods for better addressing spark plug fouling in an engine system, such as the engine system of FIG. 1. An engine controller may be configured to perform a control routine, such as the routine of FIG. 2, in response to a spark plug fouling indication to adjust the engine's EGR schedule so as to enable spark plug tip temperatures to be maintained elevated and soot accumulated on a fouled spark plug to be burned off. The EGR adjustment performed may vary when the engine is a green engine of a vehicle at an assembly plant, as shown at FIG. 3, or a non-green engine of a vehicle that has left the assembly plant, as shown at FIG. 4.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (i.e. cylinder) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 30. In one example, exhaust passage 148 may receive exhaust from all the cylinders of engine 10. However, in some embodiments, as elaborated at FIG. 2, the exhaust from one or more cylinders may be routed to a first exhaust passage, while the exhaust from one or more other (remaining) cylinders may be routed to a second, different exhaust passage, the distinct exhaust passages then converging further downstream, at or beyond an exhaust emission control device. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Engine 10 may further include an exhaust gas recirculation (EGR) system to route a portion of exhaust gas from exhaust passage 148 to intake manifold 144. FIG. 1 shows a low pressure EGR (LP-EGR) system, but an alternative embodiment may include only a high pressure EGR (HP-EGR) system, or a combination of both LP-EGR and HP-EGR systems. The LP-EGR is routed through LP-EGR passage 149 from downstream of turbine 176 to upstream of compressor 174. The amount of LP-EGR provided to intake manifold 144 may be varied by controller 12 via LP-EGR valve 152. The LP-EGR system may include LP-EGR cooler 158 to reject heat from the EGR gases to engine coolant, for example. When included, the HP-EGR system may route HP-EGR through a dedicated HP-EGR passage (not shown) from upstream of turbine 176 to downstream of compressor 174 (and upstream of intake throttle 20), via an HP-EGR cooler. The amount of HP-EGR provided to intake manifold 144 may be varied by controller 12 via an HP-EGR valve (not shown).

Under some conditions, the EGR system may be used to regulate the temperature of the air and fuel mixture within combustion chamber 30. Thus, it may be desirable to measure or estimate the EGR mass flow. For example, one or more sensors 159 may be positioned within LP-EGR passage 149 to provide an indication of one or more of a pressure, temperature, and air-fuel ratio of exhaust gas recirculated through the LP-EGR passage. Exhaust gas diverted through LP-EGR passage 149 may be diluted with fresh intake air at a mixing point located at the junction of LP-EGR passage 149 and intake passage 142. In some examples, where an air intake system (AIS) throttle is included in intake passage 142, upstream of compressor 174, by adjusting LP-EGR valve 152 in coordination with the air intake system throttle, a dilution of the EGR flow may be adjusted.

A percent dilution of the LP-EGR flow may be inferred from the output of a sensor in the engine intake gas stream. For example, a sensor 145 positioned downstream of LP-EGR valve 152, and upstream of main intake throttle 20, may be used so that the LP-EGR dilution at or close to the main intake throttle may be accurately determined. Sensor 145 may be, for example, an oxygen sensor such as a UEGO sensor.

Each cylinder of engine 10 may include a spark plug 192 for initiating combustion. Ignition system 190 can provide an ignition spark to combustion chamber 30 via spark plug 192 in response to spark advance signal SA from controller 12, under select operating modes. In particular, in response to the spark signal from the controller, ignition system 190 may apply a high-voltage bias across spark plug 192 to enable ionization sensing. The high-voltage bias may be applied across the spark gap and may be applied prior to ignition coil dwell. During selected conditions, an additional high-voltage bias may be applied during ignition coil dwell. Ignition system 190 may include one or more ignition coils and other circuitry/electronics to actuate the associated spark plug, and provide ion sensing, such as an ion sensing module 194. Ion sensing module may include an ion sensor. Alternatively, the spark plug may be used for ion sensing. Charging of the ignition coil may be powered by a high-voltage power supply (not shown) or by battery voltage. Use of a boosted voltage provided by a high-voltage power supply may provide various advantages, such as reducing ignition coil charge time and dwell time, which generally allows greater ignition timing flexibility and/or a longer ionization sensing period.

In one embodiment, each spark plug includes a dedicated coil and associated electronics to provide sparking and ion sensing. Alternatively, a single ignition module may be associated with multiple spark plugs with ionization sensing provided using a power pair arrangement to reduce the number of necessary control lines. The depicted embodiment illustrates a single spark plug in each cylinder that functions to ignite the fuel mixture. However, the present disclosure may be used in applications that use dual spark plugs with one or both providing mixture ignition and/or ion sensing.

Controller 12 may include code implemented by software and/or hardware to monitor an ionization current of the spark plug to detect a spark plug fouling condition. As discussed further below with reference to FIG. 2, in response to the spark plug fouling condition, controller 12 may employ various corrective actions or control procedures to burn off soot deposited on the fouled spark plug. Control procedures to remove spark plug deposits may include advancing of ignition timing, as well as an increase in engine speed/load. The various control actions are used to raise the spark plug tip temperature and burn off accumulated soot. In addition, an EGR schedule may be adjusted (in particular, reduced) during the spark plug cleaning to allow the elevated spark plug tip temperatures to be maintained.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. It will be appreciated that, in an alternate embodiment, injector 166 may be a port injector providing fuel into the intake port upstream of cylinder 30.

It will be appreciated that in still further embodiments, the engine may be operated by injecting a variable fuel blend or knock/pre-ignition suppressing fluid via two injectors (a direct injector 166 and a port injector) and varying a relative amount of injection from each injector.

Fuel may be delivered to fuel injector 166 via a high pressure fuel system 80, including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

Fuel may be delivered by the injector(s) to the cylinder during a single engine cycle of the cylinder. Further, the distribution and/or relative amount of fuel delivered from the injector(s) may vary with operating conditions. For example, the distribution may vary with a rate of change of a cylinder aircharge, a nature of an abnormal cylinder combustion event (such as, whether there is a cylinder misfire event, knock event, or pre-ignition event). Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 80 may hold fuel or knock/pre-ignition suppressing fluids with different qualities, such as different compositions. These differences may include different alcohol content, different water content, different octane, different heat of vaporizations, different fuel blends, and/or combinations thereof etc. In one example, fuels or knock/pre-ignition suppressing fluids with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. In yet another example, one of the fluids may include water while the other fluid is gasoline or an alcohol blend. Additionally, the first and second fuels may also differ in other fuel qualities such as a difference in temperature, viscosity, octane number, latent enthalpy of vaporization etc. Still other pre-ignition suppressing fluids may include water, methanol, washer fluid (which is a mixture of approximately 60% water and 40% methanol), etc.

Moreover, fuel characteristics of the fuel or pre-ignition suppressing fluid stored in the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

Engine 10 may further include one or more knock sensors, accelerometers, vibrations sensors, or in-cylinder pressure sensors to sense engine block vibrations, such as those related to knock or pre-ignition. Further, the accelerometers, vibrations sensors, in-cylinder pressure sensors, and ionization sensors (not shown) may be used to indicate a cylinder misfire event (such as a cylinder misfire event triggered by spark plug fouling) and distinguish the misfire event from knock or pre-ignition events.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, spark plug ionization current from an ionization sensor of ionization sensing module 194, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. Still other sensors such as cylinder pressure sensors, knock sensors, and/or pre-ignition sensors may be coupled to engine 10 (e.g., to a body of the engine) to help in the identification of abnormal combustion events. The controller 12 receives signals from the various sensors of FIG. 1 and employs the various actuators of FIG. 1 to adjust engine operation based on the received signals and instructions stored on a memory of the controller. Storage medium read-only memory 110 can be programmed with computer readable data representing instructions executable by processor 106 for performing the methods described below as well as other variants that are anticipated but not specifically listed.

Figure 2:
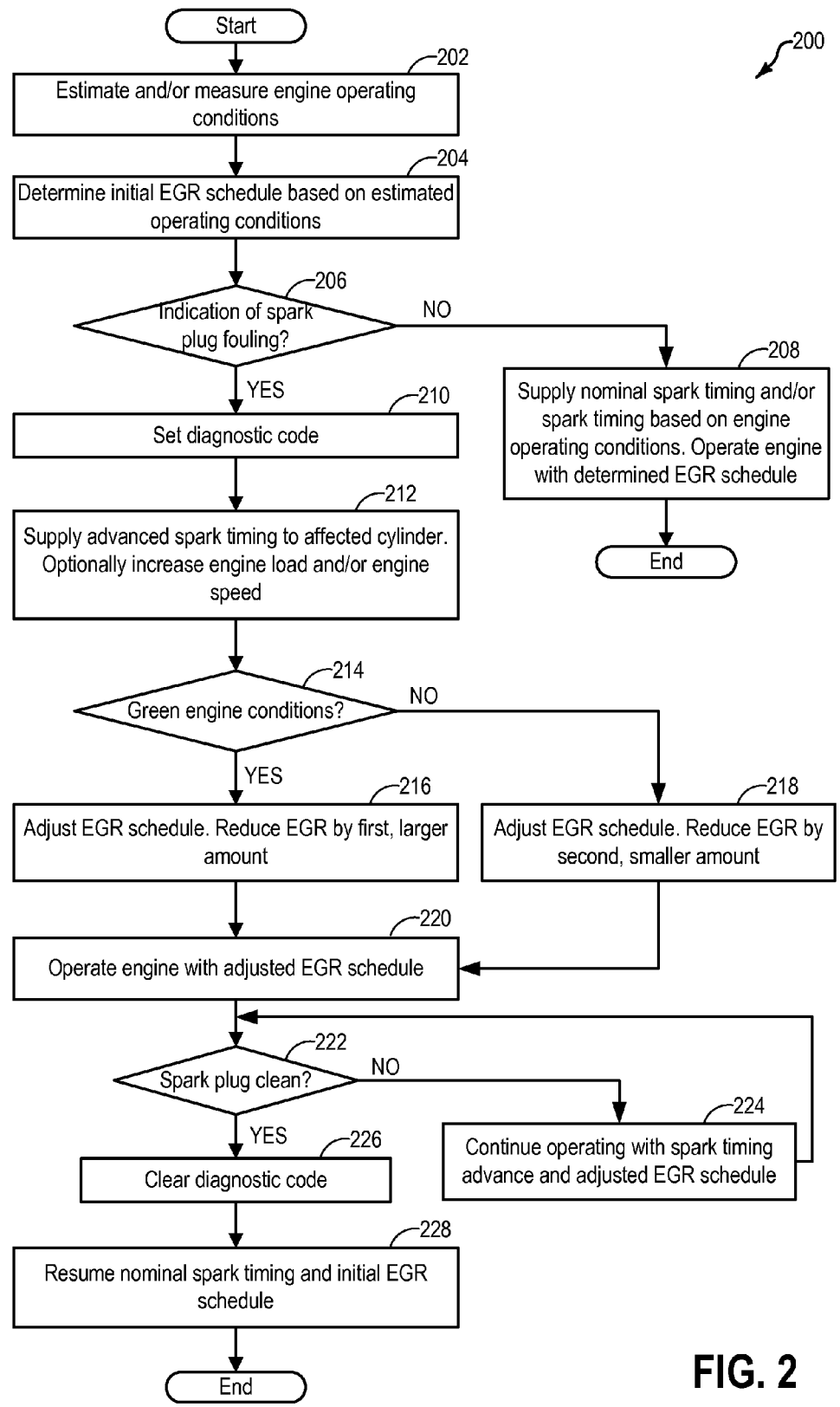
FIG. 2 shows a high level flow chart for adjusting an engine EGR schedule in response to an indication of spark plug fouling.
Figure 3:
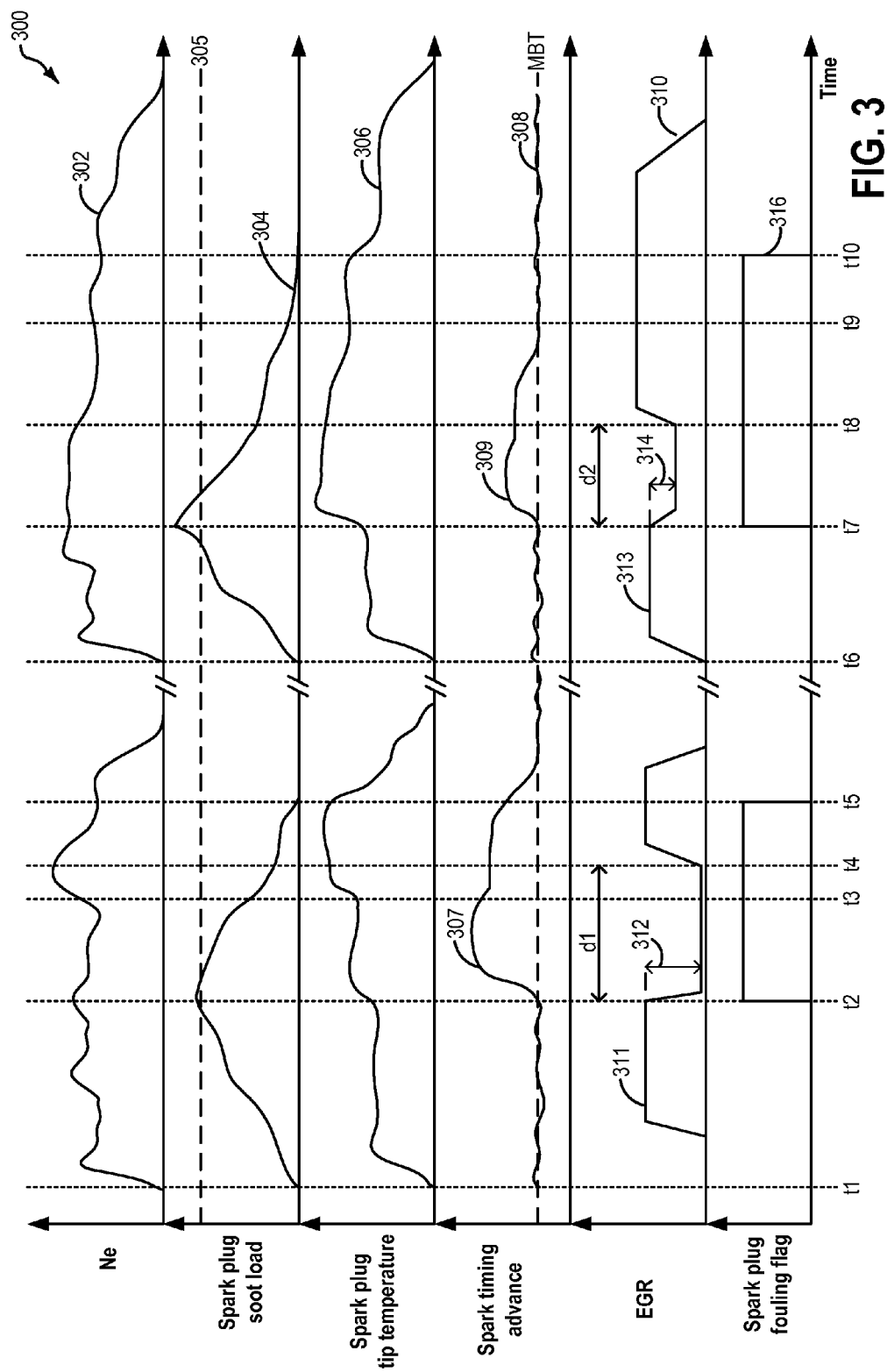
FIG. 3 shows an example engine spark timing and EGR schedule adjustment performed in response to a spark plug fouling event in a green engine.

Now turning to FIG. 2, an example method 200 is described for adjusting an engine EGR schedule responsive to an indication of fouling of a spark plug. The adjustment allows spark plug tip temperatures to be maintained warm enough to burn off any accumulating soot. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating and/or measuring engine operating conditions. These include, for example, engine speed, engine load, engine temperature, driver torque demand, exhaust catalyst temperature, output of an ion sensor, spark plug ionization current, etc. At 204, based on the estimated engine operating conditions, an initial EGR schedule may be determined. The initial EGR schedule may include determining an amount of EGR to be delivered as LP-EGR and an amount of EGR to be delivered as HP-EGR. In addition, a desired EGR dilution may be determined. For example, a percentage dilution to be maintained even as engine speed and load changes may be determined. Based on the desired EGR dilution, a corresponding EGR valve opening or position may also be determined.

At 206, it may be determined if there is an indication of spark plug fouling. In one example, spark plug fouling may be indicated based on the occurrence of one or more cylinder misfire events. In another example, spark plug fouling may be indicated based on the ionization current of the spark plug, or the output of an ion sensor coupled to the spark plug. For example, if the ionization current is lower than a threshold, spark plug fouling due to soot accumulation may be determined. As such, a steady-state ionization signal (e.g., current) prior to energization of the ignition coil of the spark plug, also referred to as the pre-dwell phase, exceeds the threshold. The pre-dwell ionization signal provides a measurement of the shunt resistance, which reduces as conductive carbon-containing deposits (soot) form on the spark plug. If the ionization current is lower than the threshold, it indicates an elevated shunt resistance due to spark plug fouling. Spark plug fouling and a need for spark plug cleaning may alternatively be inferred based on one or more of a spark plug tip temperature model, ion fouling feedback time, time elapsed since start, and time elapsed since operating the engine at a condition where self-cleaning of the spark plug does not occur (such as at lower than threshold engine speeds and loads).

If spark plug fouling is not indicated, at 208, the method includes supplying nominal spark timing (or an alternate spark timing based on the estimated engine operating conditions) to the engine cylinders. In addition, the engine may be operated with the determined EGR schedule by adjusting the EGR valve (in the HP-EGR passage, LP-EGR passage, or both, as required) to the determined position to provide the determined dilution. From there, the method exits.

If spark plug fouling is indicated, at 210, the method includes setting a diagnostic code. The diagnostic code indicates that the spark plug is soot fouled and a spark plug cleaning condition is present. Spark plug cleaning can then be attempted to burn off the soot accumulated on the spark plug.

Spark cleaning is then initiated at 212 by expediting an increase in spark plug tip temperature. Spark plug tip temperature increase is expedited by supplying advanced spark timing. Specifically, spark timing is advanced from a nominal timing (e.g., advanced from MBT), a degree of advance based on the indication of spark plug fouling. For example, based on the ion sensor output, a soot load on the spark plug may be estimated. Then, as the soot load increases above a threshold level, or as a cylinder misfire occurrence (due to the fouled spark plug) increases, spark timing may be advanced further from MBT. Additionally or optionally, advanced spark timing may be supplied for a longer duration (e.g., a larger number of combustion events).

Increase in spark plug tip temperature may be further expedited by one or more of increasing engine speed and increasing engine load. For example, if the engine is at idle, engine speed may be increased from a nominal idle speed of ~700 RPM to a high idle speed of 1250 RPM, and engine load may be increased from 0.08 bar to 0.18 bar. In addition, engine load may be increased by increasing friction load, such as by commanding a higher engine oil pressure, an increase in alternator current, etc. In one example, during drive conditions where it may be difficult to increase an engine speed without affecting vehicle speed, engine speed may be increased by downshifting a transmission gear, or opening/unlocking a torque converter.

At 214, the method includes confirming green engine conditions. As such, a green engine corresponds to the engine of a vehicle in a pre-delivery state at an assembly plant. In one example, a green engine condition may be determined based on a number of key-on events that have elapsed, as well as a duration of each key-on event (that is, a duration elapsed between key-on and key-off for each key-on event). For example, the engine may be a green engine at a first engine start (or a first number of engine starts) following vehicle assembly and before the vehicle leaves the assembly plant. As such, while the engine is still a green engine, various tests may be performed on the engine to assess the function of all the engine components. In addition, various functions may be diagnosed, such as emissions compliance, leak detection, etc.

One example of determining a green engine condition based on a number of key-on events may include determining whether a specified duration of engine run time has elapsed since an initial key-on event. A green engine condition may be determined to be present during an initial key-on event, and for a further number of key-on events that occur within a specified duration of engine run time since the initial key-on event. As another example, the engine may be determined to be in a green condition based on an integrated value of a number of key-on events since the initial key-on event, and a duration of each of the number of key-on events. If the integrated value is less than a threshold duration, the engine may be in a green condition. After the threshold duration, the engine may be determined to be in a non-green condition. As such, it is expected that by the threshold duration, or the threshold number of key-on events, the vehicle encompassing the engine has left the assembly plant and has been delivered to a customer/operator (that is, the engine is in a post-delivery state).

Upon confirming green engine conditions, at 216, the method includes, responsive to the spark plug cleaning requirement, adjusting the EGR schedule of the green engine. Specifically, the method includes reducing EGR by a larger amount when operating the green engine at a vehicle assembly plant (pre-delivery). Since EGR leads to combustion cooling, by reducing the EGR by a larger amount, higher combustion temperatures, and thereby higher spark plug tip temperatures, may be achieved. In addition, EGR may be reduced by a larger amount during the pre-delivery conditions without worry of an emissions impact since there is no emissions requirement in the pre-delivery state. In one example, reducing EGR by a larger amount includes disabling EGR. For example, control signals may be sent from the engine controller to an electromechanical actuator coupled to the EGR valve to actuate the EGR valve to a fully-closed position. In addition, EGR may be reduced by the larger amount for a longer duration when operating the green engine at the vehicle assembly plant since the emissions impact of the adjustment is not a concern. Further, EGR and spark timing may be optimized so as to achieve a higher rise in spark plug tip temperature. For example, EGR may be reduced by a larger amount while advancing spark timing by an amount to provide higher combustion temperatures. The EGR is reduced from the initial schedule based on engine operating conditions, as determined at 204.

If green engine conditions are not confirmed, at 218, the method includes, responsive to the spark plug cleaning requirement, adjusting the EGR schedule of the non-green engine. Specifically, the method includes reducing EGR by a smaller amount when operating the non-green engine after the vehicle (propelled by the engine) has left the assembly plant (post-delivery) to reduce the emissions impact of the adjustment (since there are stricter emissions requirements in the post-delivery state). In addition, EGR may be reduced by the smaller amount for a shorter duration when operating the non-green engine after the vehicle has left the vehicle assembly plant. The shorter duration also enables the emissions impact of the adjustment to be minimized. The EGR is reduced from the initial schedule based on engine operating conditions, as determined at 204. At 220, the method includes operating the engine with the adjusted EGR schedule, determined at 216 or 218.

As used herein at 216 and 218, reducing EGR includes decreasing an opening of an EGR valve coupling an engine exhaust manifold to an engine intake manifold. For example, control signals may be sent from an engine controller to an electromechanical actuator coupled to the EGR valve, the signals causing the actuator to actuate the EGR valve towards a closed position (e.g., to a partially closed position). As used herein, the EGR that is reduced may be one or more of low pressure EGR and high pressure EGR.

In one example, reducing EGR by a smaller amount responsive to the spark plug cleaning condition in the non-green engine may include control signals being sent from the engine controller to the electromechanical actuator coupled to the EGR valve to actuate the EGR valve towards a fully-closed position.

In some examples, the reducing of EGR from the initial schedule may be further adjusted based on an engine pre-ignition rate (or cylinder pre-ignition history). For example, the EGR reduction may be smaller (that is, there is less reduction in EGR and the adjusted EGR schedule is closer to the initial EGR schedule) when the engine pre-ignition count is higher. As another example, the EGR reduction may be larger (that is, there is more reduction in EGR and the adjusted EGR schedule is further from the initial EGR schedule) when the engine pre-ignition count is lower. This is due to the high heat transfer to the spark plug from the early combustion of the pre-ignition event. By adjusting the EGR schedule based on cylinder pre-ignition history, combustion chamber temperatures may be better controlled to expedite spark plug cleaning. In addition, the EGR reduction may be adjusted so that EGR may be optimized to a level where a combination of EGR reduction and spark timing advance can be used to raise the spark plug tip temperature with minimal emissions impact.

It will be appreciated that in some examples, the increasing of engine speed and load, as well as the supplying of an advanced spark timing, may be adjusted based on whether the engine is in a green condition or not. For example, a higher increase in engine speed and higher increase in engine load, as well as more spark advance may be used as part of a pre-delivery strategy for the green engine. As another example, a lower increase in engine speed and lower increase in engine load, as well as less spark advance may be used as part of a post-delivery strategy for the green engine. This difference may be due, at least in part, due to stricter emissions compliance requirements on the engine in the post-delivery state as compared to the pre-delivery state. The difference may be further due to the customer not being bothered by a degradation in vehicle driveability in the pre-delivery state as compared to the post-delivery state. In addition, the smaller reduction in EGR may enable the non-green engine to better comply with the stricter emissions requirement (since more EGR enables lower NOx emissions).

By reducing EGR during a spark cleaning operation, wherein spark is advanced and engine speed/load is increased, a combustion temperature may be heated up and a spark plug tip temperature may be raised and maintained high enough to burn off plug fouling deposits. By transiently disabling or decreasing the use of cooled EGR when addressing a fouled spark plug, spark plug cleaning can be expedited, improving engine performance.

At 222, it may be determined if the spark plug is clean. In one example, a soot load on the spark plug may be inferred based on a change in the spark plug's ionization current. Alternatively, the soot load of the spark plug may be inferred based on a cylinder misfire occurrence, the output of an ion sensor coupled to the spark plug, spark plug tip temperature, etc. If the inferred soot load of the spark plug is below a threshold, it may be determined that the spark plug is clean. Alternatively, if there has been more than a threshold change (specifically, more than a threshold decrease) in the soot load of the spark plug from a time when fouling was indicated (at 206), it may be determined that the spark plug is clean. If the spark plug is not determined to be sufficiently clean, than at 224, the method includes continuing the spark plug cleaning. Specifically, the method includes continuing to operate the engine with advanced spark timing, increase engine speed/load, and reduced EGR.

If the spark plug is determined to be sufficiently clean, then at 226 the method includes clearing the diagnostic code. Also, at 228, the method includes, responsive to an indication of the spark plug being clean, resuming the initial schedule of EGR. Alternatively, a nominal EGR schedule based on the existing engine operating conditions may be determined and applied.

In this way, spark plug soot cleaning may be expedited responsive to an indication of spark plug fouling, without being cooled by EGR.

Table 400 of FIG. 4 shows example spark plug cleaning actions performed in an engine coupled in a vehicle when the vehicle is in a pre-delivery state (or green engine condition), relative to when the vehicle is in a post-delivery state (or non-green engine condition). As such, the actions may be performed to address spark plug fouling in an engine cylinder.

As an example, a fouled spark plug may be cleaned by advancing spark timing from a nominal timing (such as from MBT). However, in the pre-delivery state, spark timing may be more advanced and may be supplied for a longer duration. In comparison, in the post-delivery state, spark timing may be less advanced and may be supplied for a shorter duration.

As another example, a fouled spark plug may be cleaned by increasing engine speed. However, in the pre-delivery state, a larger increase in engine speed may be applied for a longer duration. In comparison, in the post-delivery state, a smaller increase in engine speed may be supplied for a shorter duration.

As yet another example, a fouled spark plug may be cleaned by reducing EGR flow while advancing spark timing and/or while increasing engine speed. However, in the pre-delivery state, a larger reduction in EGR may be applied for a longer duration. In comparison, in the post-delivery state, a smaller reduction in EGR may be applied for a shorter duration. In one example, in the pre-delivery state, EGR may be disabled. As such, since EGR enables NOx emissions to be reduced, EGR is reduced by a larger amount in the pre-delivery state due to absence of emissions requirements, while EGR is reduced by a smaller amount in the post-delivery state due to the stricter emissions requirement.

As such, the combination of adjustments enables combustion temperatures to be raised using an optimal combination of EGR reduction and spark timing advance, thereby maintaining a spark plug tip temperature high enough to burn off any accumulated soot. In addition, more intense adjustments may be performed in the pre-delivery state without worry of a customer being bothered by a degradation in vehicle driveability. In comparison, the post-delivery state, less intense adjustments may be performed to reduce degradation in vehicle driveability that may be objectionable to a customer/operator.

Turning now to FIG. 3, an example of adjusting engine operating parameters responsive to an indication of spark plug fouling is shown. Herein, the engine is coupled in a vehicle and the adjustments vary as the vehicle moves from being operated at an assembly plant to outside the assembly plant. Map 300 depicts engine speed at plot 302, a soot load of a cylinder spark plug at plot 304, spark plug tip temperature at plot 306, spark timing advance from MBT at plot 308, EGR dilution at plot 310, and a spark plug fouling flag at plot 316. All plots are depicted over time along the x-axis.

Prior to t1, the engine may be assembled into a vehicle at an assembly plant. Subsequently, the engine may be operated to assess various engine and vehicle functions, as well as to frequently move (e.g., marshaling of) the vehicle. At t1, responsive to a first key-on event of the assembled vehicle, the engine may be started. Herein, the engine is in a green condition as the vehicle is still in a pre-delivery state at the assembly plant. Responsive to the engine start, and driver demand, engine speed (plot 302) may start to rise as the engine is operated with nominal spark timing (plot 308). In addition, EGR (e.g., LP-EGR) may be scheduled to provide an engine dilution based on the engine speed and load (plot 310). Specifically, EGR may be provided at a first level 311.

Between t1 and t2, as the engine is operated with nominal spark timing, and as engine speed and load varies responsive to driver demand, a soot load accumulating on a given engine cylinder spark plug may start to increase (plot 304). At t2, the soot load may become higher than a threshold 305, resulting in misfire events in the given cylinder. In addition, there may be drop in the spark plug ionization current. Accordingly, at t2, it may be determined that the given cylinder's spark plug is soot fouled and a fouling indication flag may be set (plot 316).

Also at t2, responsive to the indication of spark plug fouling, a spark plug cleaning routine is initiated. Therein, spark timing is advanced by a larger amount (to advanced spark timing 307) to quickly raise the spark plug tip temperature (plot 306) to a level that allows the accumulated soot to be burned off, with a corresponding drop in soot load. In addition, to enable the elevated spark plug tip temperature to be maintained, the EGR level is reduced from first level 311 by an amount 312. Advanced spark timing is maintained for a duration from t2 to t3, while the reduced EGR level is concurrently maintained. At t3, the amount of spark advance is reduced slightly to improve fuel economy and reduce the possibility of knock. At the same time, while maintaining the reduced EGR level, the engine speed may be increased, without receiving an increase in driver demand, to elevate the spark plug tip temperature further and burn off remaining soot.

At t4, once a significant portion of the accumulated soot is burned off, after providing the reduced EGR level for a duration d1 (from t2 to t4), the EGR reduction is lowered and the first level 311 of EGR is resumed. Herein, due to the engine being a green engine, a larger EGR reduction is provided, and for a longer duration d1.

At t5, in response to the spark plug soot load falling sufficiently, the spark plug may be determined to be clean, and the flag may be cleared. Shortly thereafter the engine may be shut-down responsive to a key-off event.

Between t5 and t6, a long duration may elapsed, in which time, the assembled vehicle may leave the assembly plant and be delivered to a customer. During this post-delivery state, the engine may no longer be a green engine.

At t6, responsive to a first key-on event of the vehicle after leaving the assembly plant, the engine may be started. Herein, the engine is in a non-green condition as the vehicle is in a post-delivery state. Responsive to the engine start, and driver demand, engine speed may start to rise as the engine is operated with nominal spark timing. In addition, EGR (e.g., LP-EGR) may be scheduled to provide an engine dilution based on the engine speed and load. Specifically, EGR may be provided at second level 313, lower than first level 311.

Between t6 and t7, as the engine is operated with nominal spark timing, and as engine speed and load varies responsive to driver demand, a soot load accumulating on a given engine cylinder spark plug may start to increase. At t7, the soot load may become higher than threshold 305, resulting in misfire events in the given cylinder. In addition, there may be drop in the spark plug ionization current. Accordingly, at t7, it may be determined that the given cylinder's spark plug is soot fouled and a fouling indication flag may be set.

Also at t7, responsive to the indication of spark plug fouling, a spark plug cleaning routine is initiated. Therein, spark timing is advanced by a smaller amount (to advanced spark timing 309) to quickly raise the spark plug tip temperature to a level that allows the accumulated soot to be burned off, with a corresponding drop in soot load. In addition, to enable the elevated spark plug tip temperature to be maintained, the EGR level is reduced from second level 313 by an amount 314 (smaller than amount 312). Advanced spark timing is maintained for a duration from t7 to t8, while the reduced EGR level is concurrently maintained. At t8, the amount of spark advance is reduced slightly to improve fuel economy and reduce the possibility of knock. Also between t7 and t8, engine speed in maintained at an elevated level, without receiving an increase in driver demand, to elevate the spark plug tip temperature further and burn off remaining soot.

At t9, once a significant portion of the accumulated soot is burned off, after providing the reduced EGR level for a duration d2 (from t7 to t9), shorter than duration d1 (from t2 to t4), the EGR reduction is lowered and the second level 313 of EGR is resumed. Herein, due to the engine being a non-green engine, a smaller EGR reduction is provided, and for a shorter duration d2.

At t10, in response to the spark plug soot load falling sufficiently, the spark plug may be determined to be clean, and the flag may be cleared. Shortly thereafter the engine may be shut-down responsive to a key-off event.

In this way, EGR can be coordinated with spark timing advance and engine speed/load adjustments to raise and maintain a spark plug tip temperature, thereby expediting cleaning of a fouled spark plug.

In one example, a method for an engine coupled in a vehicle comprises: responsive to a spark plug cleaning condition, reducing EGR by a larger amount when operating an engine at a vehicle assembly plant; and reducing EGR by a smaller amount when operating the engine after the vehicle has left the assembly plant. In the preceding example, reducing EGR may additionally or optionally include decreasing an opening of an EGR valve coupling an engine exhaust manifold to an engine intake manifold. In any or all of the preceding examples, the EGR may include one or more of low pressure EGR and high pressure EGR. In any or all of the preceding examples, reducing EGR by the larger amount may additionally or optionally include disabling EGR. Any or all of the preceding examples may additionally or optionally further comprise, reducing EGR by the larger amount for a longer duration when operating the engine at the vehicle assembly plant, and reducing EGR by the smaller amount for a shorter duration when operating the engine after the vehicle has left the assembly plant. In any or all of the preceding examples, the reducing of EGR by the larger amount may be additionally or optionally adjusted based on an engine pre-ignition rate. In any or all of the preceding examples wherein the EGR reduction is adjusted based on engine pre-ignition rate, the EGR reduction may additionally or optionally be smaller when the engine pre-ignition count is higher, the EGR reduction may additionally or optionally be larger when the engine pre-ignition count is lower. In any or all of the preceding examples, the spark cleaning condition may additionally or optionally be inferred based on one or more of a spark plug tip temperature model, ion fouling feedback time, time elapsed since start, and time elapsed since operating engine at a condition where self-cleaning of plug does not occur. In any or all the preceding examples, the method may additionally or optionally further comprise expediting increase in spark plug tip temperature during the spark plug cleaning condition by one or more of increasing engine speed, increasing engine load, and supplying advanced spark timing. In any or all the preceding examples, reducing EGR may additionally or optionally include reducing EGR from an initial schedule based on engine operating conditions. In any or all of the preceding examples, the method may additionally or optionally further comprise, responsive to an indication of the spark plug being clean, resuming the initial schedule of EGR.

Another example method for an engine may comprise: responsive to a first indication of spark plug fouling in a green engine, reducing EGR to a first level; and responsive to a second indication of spark plug fouling in a non-green engine, reducing EGR to a second level, higher than the first level. The preceding example may additionally or optionally further comprise, responsive to the first indication, maintaining EGR at the first level for a first, longer duration, and responsive to the second indication, maintaining EGR at the second level for a second, shorter duration. Any or all of the preceding examples may additionally or optionally further comprise, responsive to each of the first and second indication, supplying advanced spark timing, the advanced spark timing based on the EGR and a spark plug tip temperature. Any or all of the preceding examples may additionally or optionally further comprise, responsive to each of the first and second indication, increasing engine speed and/or engine load, the increasing based on the EGR and a spark plug tip temperature. In any or all of the preceding examples, the first level may be additionally or optionally adjusted based on a pre-ignition rate of the green engine, while the second level is additionally or optionally adjusted based on a pre-ignition rate of the non-green engine.

An example vehicle system may comprise: an engine including an intake and an exhaust; an engine cylinder; an EGR passage including an EGR valve for recirculating exhaust gas from the engine exhaust to an engine intake; a spark plug for initiating combustion in the engine cylinder; an ion sensor coupled to the spark plug for estimating a soot load on the spark plug; and a controller configured with computer readable instructions stored on non-transitory memory for: indicating spark plug soot fouling based on an output of the ion sensor; and in response to the indication: supplying advanced spark timing to the engine cylinder for one or more combustion events while reducing an opening of the EGR valve, the reducing based on a number of engine starts that have elapsed and further based on a pre-ignition count of the engine. In the preceding example system, the controller may additionally or optionally includes further instructions for, before indicating spark plug soot fouling, adjusting an opening of the EGR valve to a first position based on engine conditions including engine speed and load, and wherein the reducing the opening of the EGR valve in response to the indication includes moving the EGR valve from the first position to or towards a closed position. In any or all of the preceding example systems, the opening of the EGR valve may additionally or optionally be reduced by a smaller amount when the number of engine starts that have elapsed is higher than a threshold number. Further, the opening of the EGR valve may additionally or optionally be reduced by a larger amount when the number of engine starts that have elapsed is lower than the threshold number. In any or all of the preceding example systems, the opening of the EGR valve may be additionally or optionally increased and/or held at the reduced opening for a shorter duration as the pre-ignition count of the engine increases above a threshold count. In any or all of the preceding example systems, the controller may additionally or optionally further include further instructions for: in response to the indication, increasing an engine speed without receiving a driver demand, the engine speed increased by an amount to raise spark plug tip temperature above a threshold temperature, the threshold temperature based on the soot load of the spark plug. The engine speed may be increased without receiving a driver demand by downshifting a transmission gear and/or unlocking a torque converter so as to reduce any impact of the change in engine speed on vehicle speed.

In this way, by adjusting EGR during a fouled spark plug cleaning routine, soot removal from the fouled plug can be expedited. In addition, unwanted cooling of the spark plug can be reduced. By adjusting the EGR reduction differently based on whether the vehicle is in a pre-delivery or a post-delivery state, spark plug fouling can be addressed while keeping the engine emissions compliant. Overall, a better compromise between engine performance and fuel economy can be achieved while extending the component life of engine spark plugs.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine coupled in a vehicle, comprising:
   responsive to a spark plug cleaning condition,
   reducing EGR by a larger amount when operating an engine at a vehicle assembly plant; and
   reducing EGR by a smaller amount when operating the engine after the vehicle has left the assembly plant.

2. The method of claim 1, wherein reducing EGR includes decreasing an opening of an EGR valve coupling an engine exhaust manifold to an engine intake manifold.

3. The method of claim 1, wherein the EGR is one or more of low pressure EGR and high pressure EGR.

4. The method of claim 1, wherein reducing EGR by the larger amount includes disabling EGR.

5. The method of claim 1, further comprising, reducing EGR by the larger amount for a longer duration when operating the engine at the vehicle assembly plant, and reducing EGR by the smaller amount for a shorter duration when operating the engine after the vehicle has left the assembly plant.

6. The method of claim 1, wherein the reducing EGR by the larger amount is adjusted based on an engine pre-ignition rate.

7. The method of claim 6, wherein the EGR reduction is smaller when the engine pre-ignition count is higher, and wherein the EGR reduction is larger when the engine pre-ignition count is lower.

8. The method of claim 1, wherein the spark cleaning condition is inferred based on one or more of a spark plug tip temperature model, ion fouling feedback time, time elapsed since start, and time elapsed since operating engine at a condition where self-cleaning of plug does not occur.

9. The method of claim 1, further comprising, expediting increase in spark plug tip temperature during the spark plug cleaning condition by one or more of increasing engine speed, increasing engine load, and supplying advanced spark timing.

10. The method of claim 1, wherein reducing EGR includes reducing from an initial schedule based on engine operating conditions, the method further comprising, responsive to an indication of the spark plug being clean, resuming the initial schedule of EGR.

11. A method for an engine, comprising:
responsive to a first indication of spark plug fouling in a green engine, reducing EGR to a first level; and
responsive to a second indication of spark plug fouling in a non-green engine, reducing EGR to a second level, higher than the first level.

12. The method of claim 11, further comprising, responsive to the first indication, maintaining EGR at the first level for a first, longer duration, and responsive to the second indication, maintaining EGR at the second level for a second, shorter duration.

13. The method of claim 11, further comprising, responsive to each of the first and second indication, supplying advanced spark timing, the advanced spark timing based on the EGR and a spark plug tip temperature.

14. The method of claim 11, further comprising, responsive to each of the first and second indication, increasing engine speed and/or engine load, the increasing based on the EGR and a spark plug tip temperature.

15. The method of claim 11, wherein the first level is adjusted based on a pre-ignition rate of the green engine, and wherein the second level is adjusted based on a pre-ignition rate of the non-green engine.

16. A vehicle system, comprising:
an engine including an intake and an exhaust;
an engine cylinder;
an EGR passage including an EGR valve for recirculating exhaust gas from the engine exhaust to an engine intake;
a spark plug for initiating combustion in the engine cylinder;
an ion sensor coupled to the spark plug for estimating a soot load on the spark plug; and
a controller configured with computer readable instructions stored on non-transitory memory for:
indicating spark plug soot fouling based on an output of the ion sensor; and
in response to the indication:
supplying advanced spark timing to the engine cylinder for one or more combustion events while reducing an opening of the EGR valve, the reducing based on a number of engine starts that have elapsed and further based on a pre-ignition count of the engine.

17. The system of claim 16, wherein the controller includes further instructions for, before indicating spark plug soot fouling, adjusting an opening of the EGR valve to a first position based on engine conditions including engine speed and load, and wherein the reducing the opening of the EGR valve in response to the indication includes moving the EGR valve from the first position to or towards a closed position.

18. The system of claim 16, wherein the opening of the EGR valve is reduced by a smaller amount when the number of engine starts that have elapsed is higher than a threshold number, and wherein the opening of the EGR valve is reduced by a larger amount when the number of engine starts that have elapsed is lower than the threshold number.

19. The system of claim 18, wherein the opening of the EGR valve is increased and/or held at the reduced opening for a shorter duration as the pre-ignition count of the engine increases above a threshold count.

20. The system of claim 16, wherein the controller includes further instructions for: in response to the indication, increasing an engine speed without receiving a driver demand, the engine speed increased by an amount to raise spark plug tip temperature above a threshold temperature, the threshold temperature based on the soot load of the spark plug.

* * * * *